(12) United States Patent
Prillaman et al.

(10) Patent No.: US 10,611,064 B1
(45) Date of Patent: Apr. 7, 2020

(54) METHOD FOR SEQUENTIALLY FABRICATING A CARTRIDGE CASEBODY THROUGH INJECTION MOLDING

(71) Applicant: U.S. Army Combat Capabilities Development Command Armaments Center, Picatinny Arsenal, Dover, NJ (US)

(72) Inventors: Daniel Lee Prillaman, Montclair, NJ (US); Leon Moy, Montclair, NJ (US); Viral Panchal, Parlin, NJ (US); Richard Wu, Oakland Gardens, NY (US); Patrick Mark, Whitestone, NY (US); Kevin Mulligan, Denville, NJ (US); Jesse Sunderland, Franklin, NJ (US); James Grassi, Rockaway, NJ (US); Jason Wasserman, Oak Ridge, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/369,459

(22) Filed: Mar. 29, 2019

Related U.S. Application Data

(63) Continuation-in-part of application No. 15/140,806, filed on Apr. 28, 2016, now abandoned, which is a
(Continued)

(51) Int. Cl.
*B29C 45/14* (2006.01)
*B29C 44/12* (2006.01)
(Continued)

(52) U.S. Cl.
CPC .......... *B29C 44/1228* (2013.01); *B29C 44/42* (2013.01); *B29C 45/14* (2013.01);
(Continued)

(58) Field of Classification Search
None
See application file for complete search history.

(56) References Cited

U.S. PATENT DOCUMENTS 1,154,437 A * 9/1915 Rimailho ................ F42B 12/32
102/496
2,564,751 A * 8/1951 Cook ...................... F42B 12/32
102/482

(Continued)

*Primary Examiner* — Edmund H Lee
(74) *Attorney, Agent, or Firm* — John P. DiScala

(57) ABSTRACT

There is provided a mold apparatus and process whereby a warhead body can be fabricated in a single over molding process which may also include therein metal fragments, metal balls, obturators, boat tails and other aerodynamic features, metal rings and/or threads. Other molds and processes are presented whereby a warhead body may be over molded in a polymer matrix in sequential steps which may include adding therein metal balls, then fragments, and any of obturators, boat tails and other aerodynamic features, metal rings and/or threads, as desired. Still another process for fabricating a warhead body is presented whereby an insert section is first preloaded with metal fragments and covered with a skin, then the insert section is inserted into an oversized area in a mold, and polymer is then loaded around the insert section to form a unitary warhead body.

8 Claims, 8 Drawing Sheets

Related U.S. Application Data continuation-in-part of application No. 15/095,496, filed on Apr. 11, 2016, now abandoned.

(60) Provisional application No. 62/186,525, filed on Jun. 30, 2015.

(51) Int. Cl.
*B29C 44/42* (2006.01)
*B29L 31/00* (2006.01)
*B29K 705/08* (2006.01)
*B29K 1/00* (2006.01)

(52) U.S. Cl.
CPC .. *B29C 45/14065* (2013.01); *B29C 45/14467* (2013.01); *B29C 45/14819* (2013.01); *B29K 2001/00* (2013.01); *B29K 2705/08* (2013.01); *B29L 2031/777* (2013.01)

(56) References Cited

U.S. PATENT DOCUMENTS

| | | | | |
|---|---|---|---|---|
| 3,159,701 | A * | 12/1964 | Herter | B29C 45/26 264/328.12 |
| 3,284,559 | A * | 11/1966 | Assmann | B29C 45/14778 264/250 |
| 3,363,562 | A * | 1/1968 | Umbach | F42B 5/26 102/467 |
| 3,722,411 | A * | 3/1973 | Herter | F42B 5/30 102/466 |
| 3,878,791 | A * | 4/1975 | Askwith | C06B 21/0091 102/283 |
| 8,381,657 | B1 * | 2/2013 | Hooke | F42B 8/26 102/481 |
| 8,689,669 | B2 * | 4/2014 | Ronn | F42B 12/32 102/496 |
| 2009/0211484 | A1 * | 8/2009 | Truitt | F42B 12/32 102/497 |

* cited by examiner

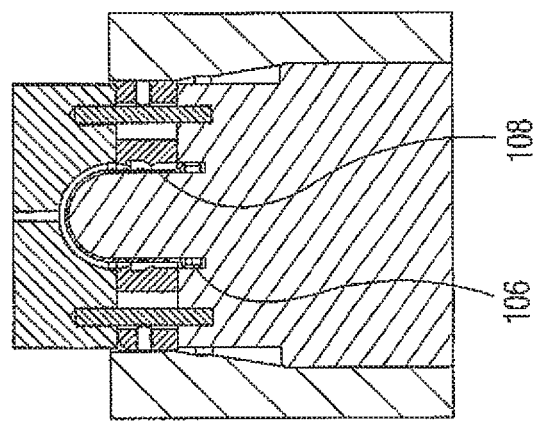
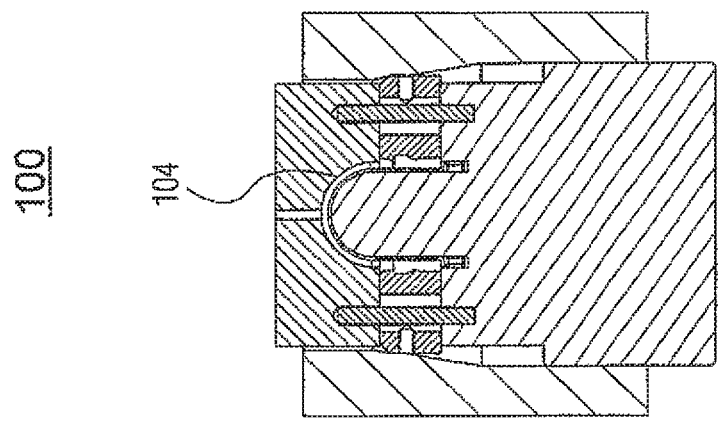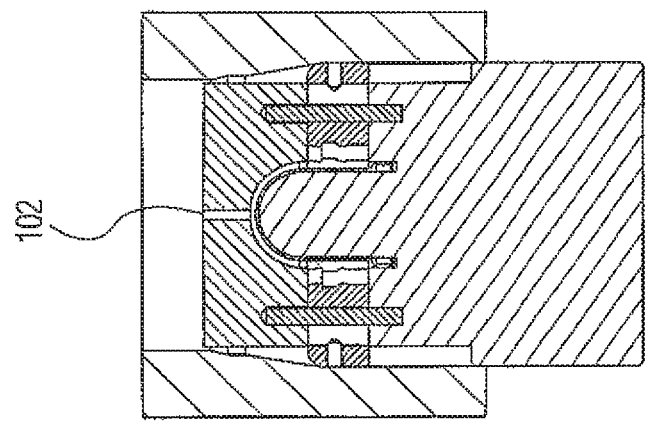

US 10,611,064 B1

METHOD FOR SEQUENTIALLY FABRICATING A CARTRIDGE CASEBODY THROUGH INJECTION MOLDING

CROSS REFERENCE TO RELATED APPLICATION

This application is a continuation in part of application Ser. No. 15/140,806 filed Apr. 28, 2016, now abandoned, which itself is a continuation in part of application Ser. No. 15/095,496 filed Apr. 11, 2016 of same inventors, same assignee, and having the same title, and which application Ser. No. 15/095,496 in itself claims benefit under 35 U.S.C. 119 (e) from provisional application 62/186,525 filed Jun. 30, 2015, the entire file wrapper contents of all which applications are hereby incorporated by reference as though fully set forth.

U.S. GOVERNMENT INTEREST

The inventions described herein may be made, used, or licensed by or for the U.S. Government for U.S. Government purposes.

BACKGROUND OF INVENTION

The inventions described herein are useful in molding processes to locate pre-formed embedded fragments, obturators, aerodynamic boat tails and other desired components while manufacturing munitions. This utility has been developed using a 120 mm Projectile, an 81 mm Mortar, and a 40 mm grenade, but is not limited only to those specific warheads.

It is common for metal preformed fragments to be used in warheads. These fragments increase the lethal consistency of munitions by pre determining the size and mass of parts of the warhead. A polymer matrix can be used to keep such fragments in place during storage and launch. The polymer allows the energetic to accelerate the fragments with minimal effect on fragment velocities. The polymer is also used to position the fragments on the warhead.

There are challenges however in manufacturing using these approaches. Preformed fragments need a matrix material to envelop them to keep position and integrity during storage and launch. Polymer matrixes can be applied using low viscosity epoxies by pouring the material into a mold, but this process takes a significant amount of time to mix the epoxy, pour it into a mold cavity with the fragments, and allow it to cure. Warhead design may also require additional features that are problematic to existing processes. These include designs where fragments are not wanted in specific areas of the part. Old way to solve these problems included use of faster curing resin systems, and then use of post curing machining operations. A problem with the old ways was that two part resin systems can lead to errors in production due to incorrect mix ratios. This then requires many molds to increase production rate without actually improving cycle times. If a part is divided into multiple sections to be fabricated, it may require a process where material has to completely cure before adding in additional fragments and finishing the cycle. Post machining operations can also damage the polymer matrix and also increase cycle times. Obturators are often added then after processing as an extra step. Alternatively, celluloid material come in sheets that are not applicable as a matrix material with old ways. The celluloid in this form does not allow full embedding of the preformed fragments.

BRIEF SUMMARY OF INVENTION

The above mentioned shortcomings are addressed in this invention using new molding processes which utilize shorter duration processing methods that employ transfer molding and injection molding.

OBJECTS OF THE INVENTION

Accordingly, it is an object of the present invention to provide a mold and process whereby a warhead can be fabricated in a single over molding process which may also include therein metal fragments, metal balls, obturators, boat tails and other aerodynamic features, metal rings and/or threads.

Another object of the present invention is to provide molds and processes whereby a warhead may be over molded in a polymer matrix in sequential steps which may include adding therein metal balls, then fragments, and any of obturators, boat tails, T-sections to attach boat tails, multiple liners/pushers and other aerodynamic features, metal rings and/or threads, as may be desired.

A yet another object of the invention is to provide a process for fabricating a warhead body whereby an insert section is first preloaded with metal fragments and covered with a skin, then the insert section is inserted into an oversized area in a mold, and polymer is then loaded around the insert section to form a unitary warhead body.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

FIGS. 1A-1C show a mold assembly process used for fabricating a single stage M433 40 mm round according to the invention, in which FIG. 1A is the first position of the mold 100; FIG. 1B is the second position of the mold, and; FIG. 1C is the final position of the mold thereof.

FIGS. 2A-2H show a multiple stage molding process where each molding stage is done in a different cavity that includes the previous stage according to the invention, in which FIGS. 2A, 2E and 2G show the exterior of mold 200; FIGS. 2B, 2C and 2D show over molding of balls onto a cylindrical section of a munition; FIGS. 2B, 2C and 2F show over molding of fragments onto a dome section of a munition; and FIG. 2H shows fabrication of a boat tail section thereon.

Figure 4:
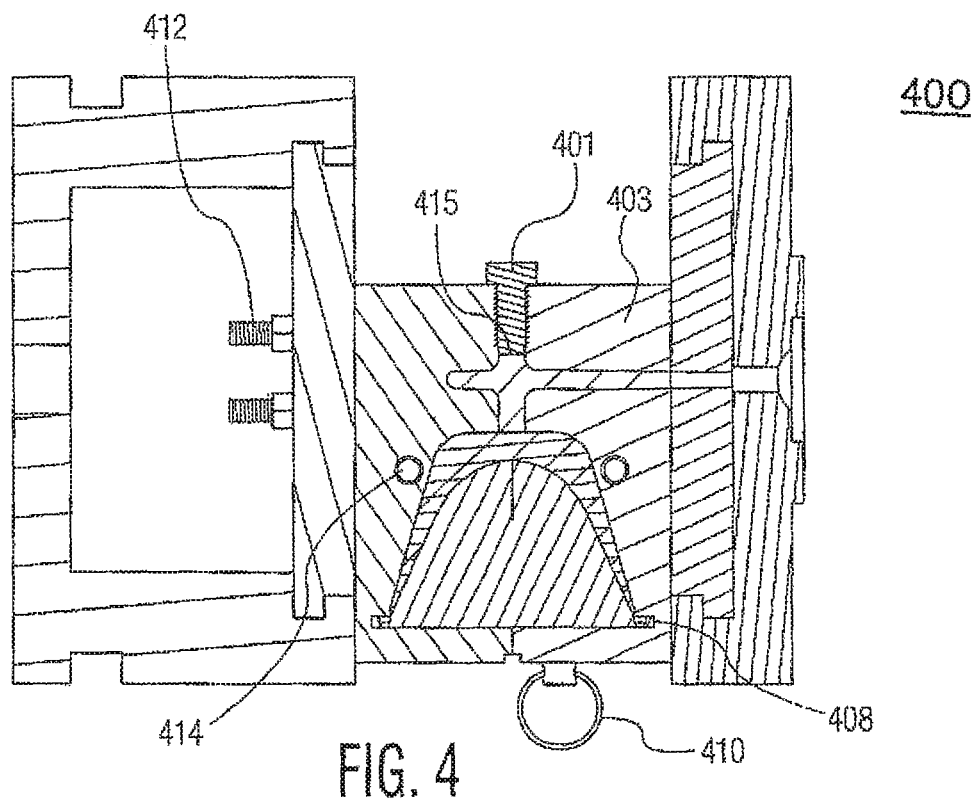
FIG. 4 shows a fabrication method in a single mold 400 with geometry shaped to a final desired shape according to the invention.
Figure 5:
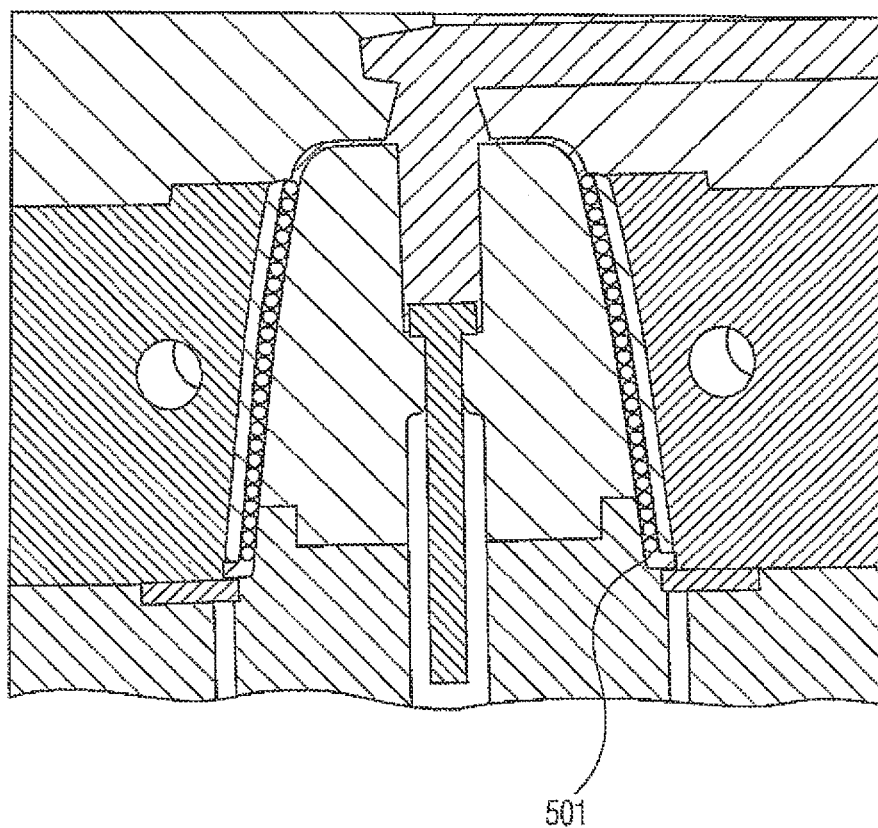

FIG. 5, captioned as 500, also illustrates the FIG. 4 category device providing over molding of a structural feature onto a work part according to the invention.

Figure 6A:
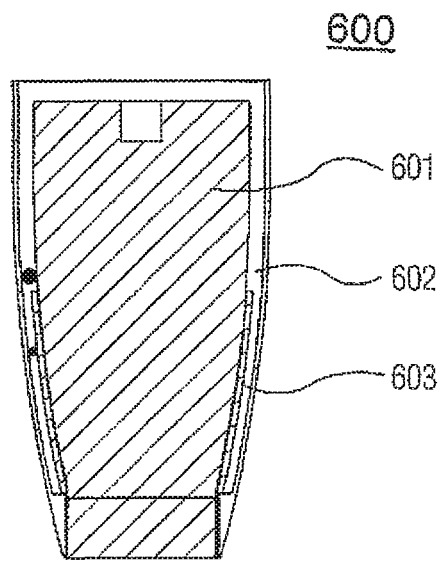
Figure 6B:
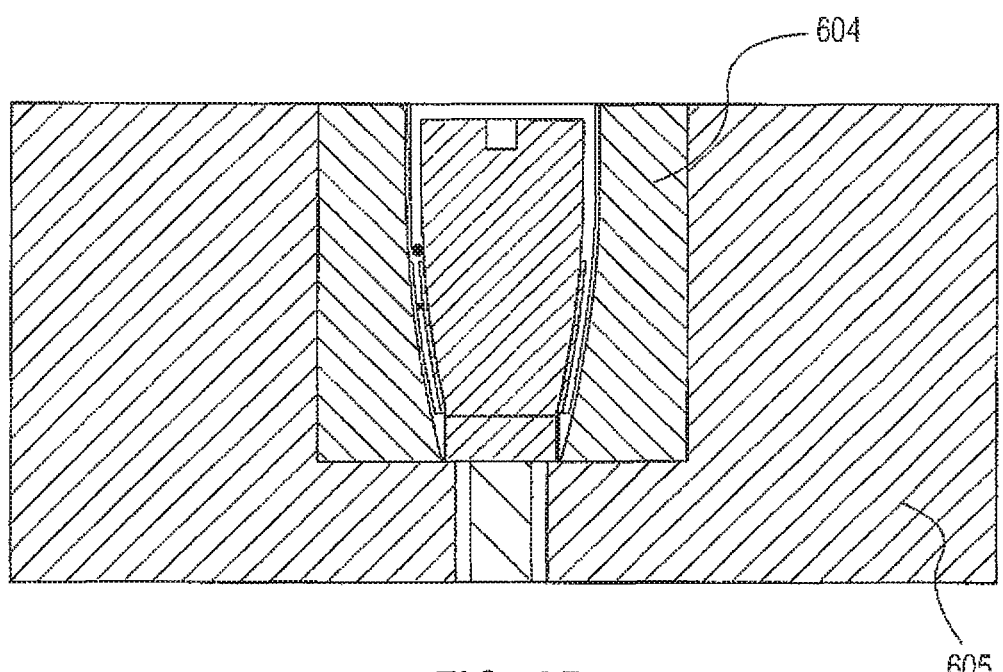

FIGS. 6A shows pre-loading of fragments into a removable mold insert then covered by a skin 600, and FIG. 6B shows the preloaded core inserted into a mold assembly for matrix material then to be injected into the area around the core, according to the invention.

DETAILED DESCRIPTION

Figure 2A:
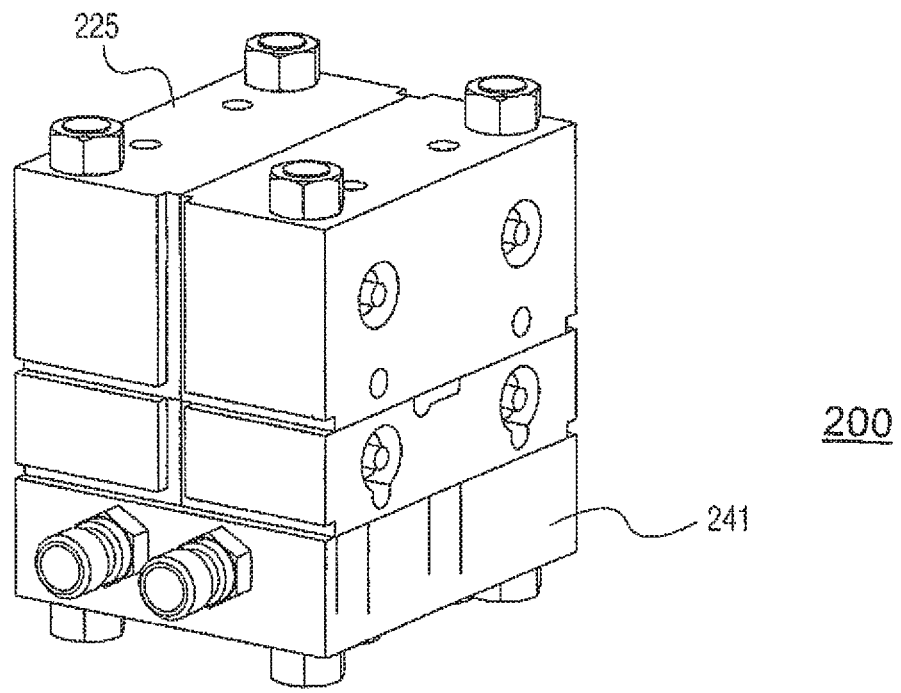
Figure 2B:
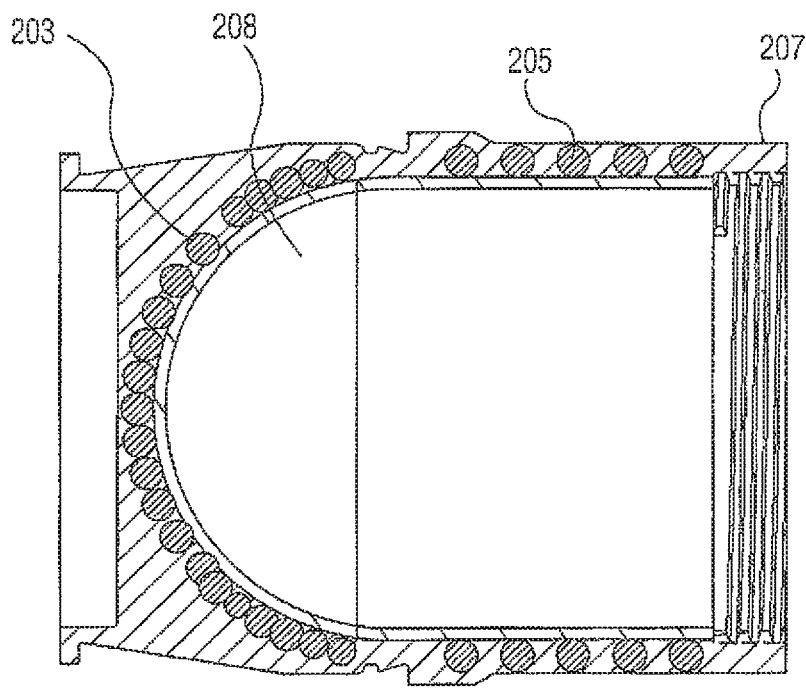
Figure 2C:
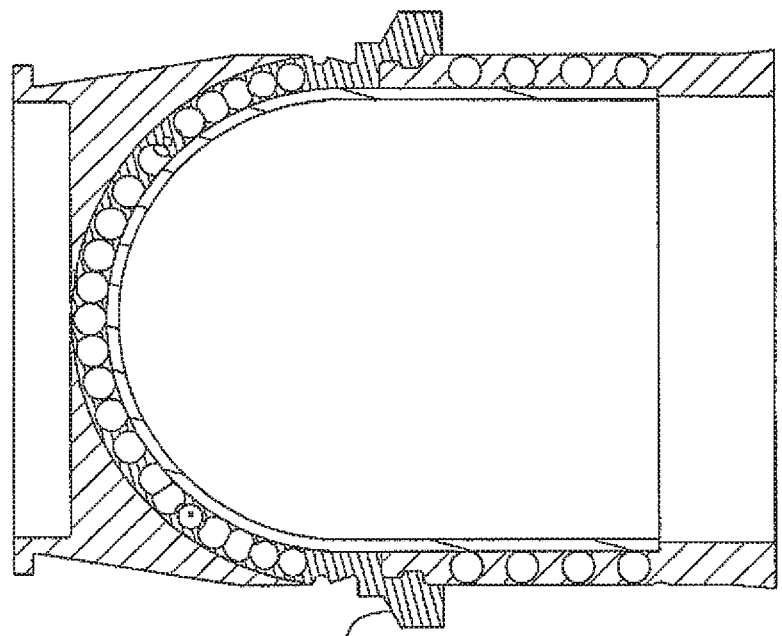
Figure 2D:
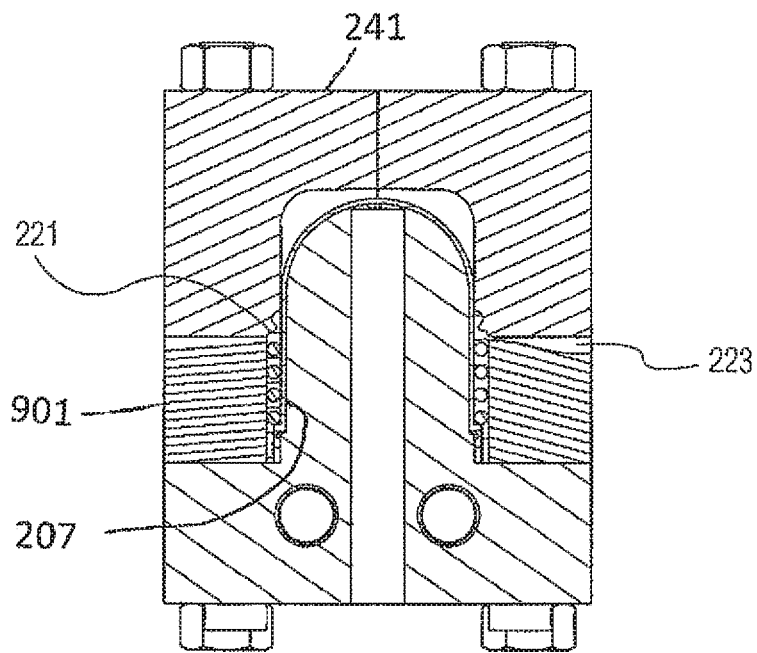
Figure 2E:
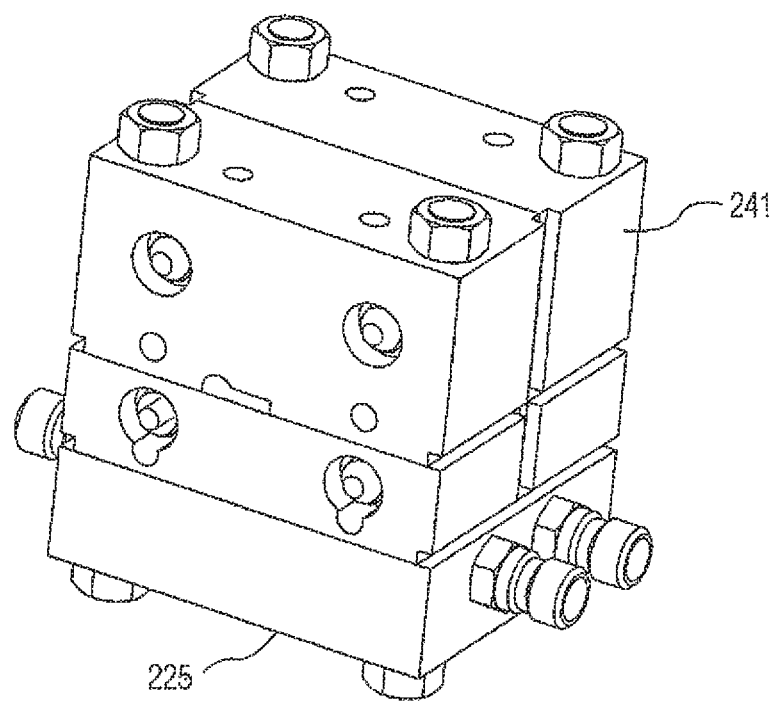
Figure 2F:
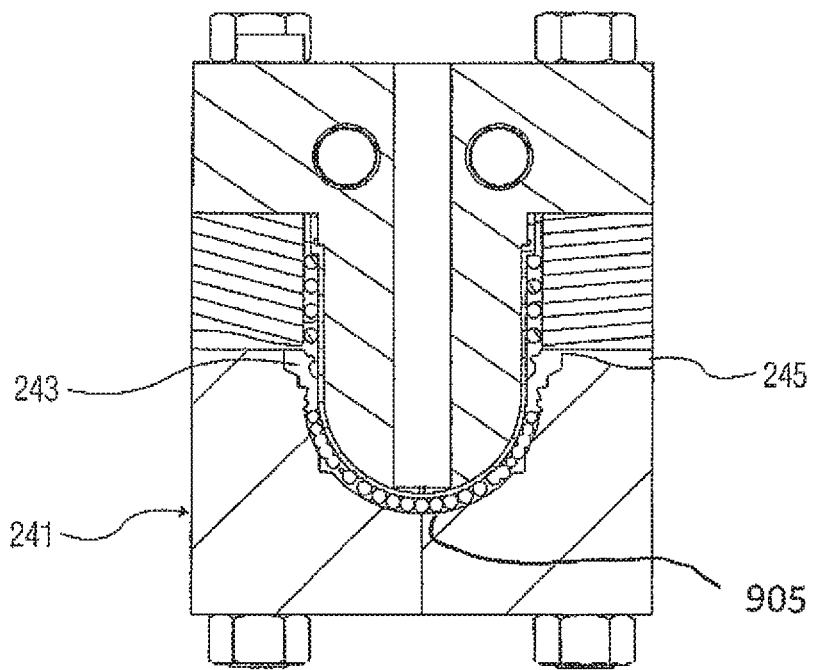
Figure 2G:
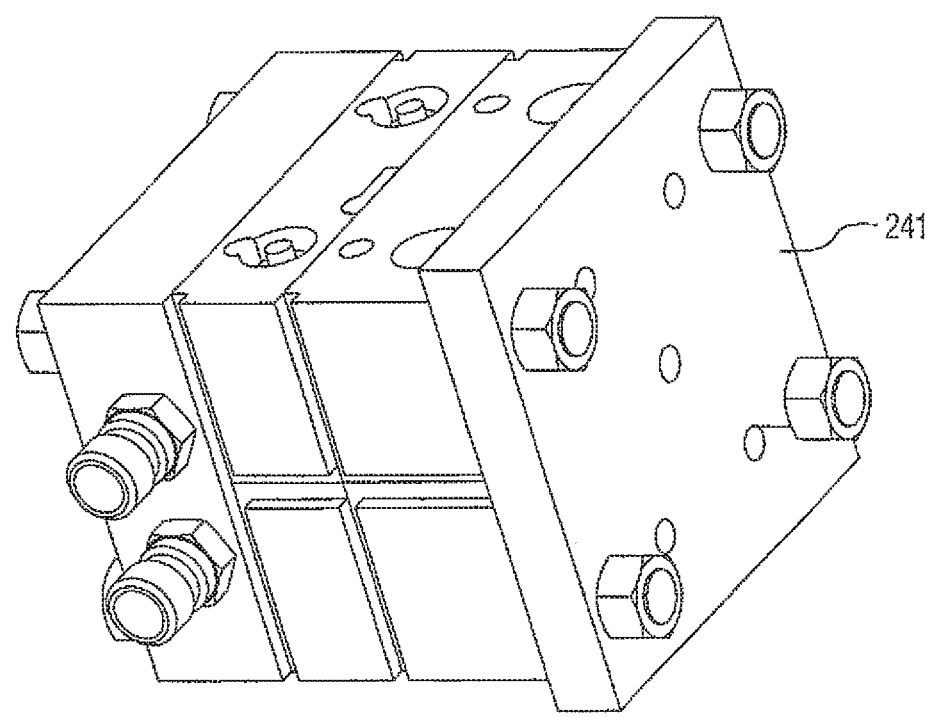
Figure 2H:
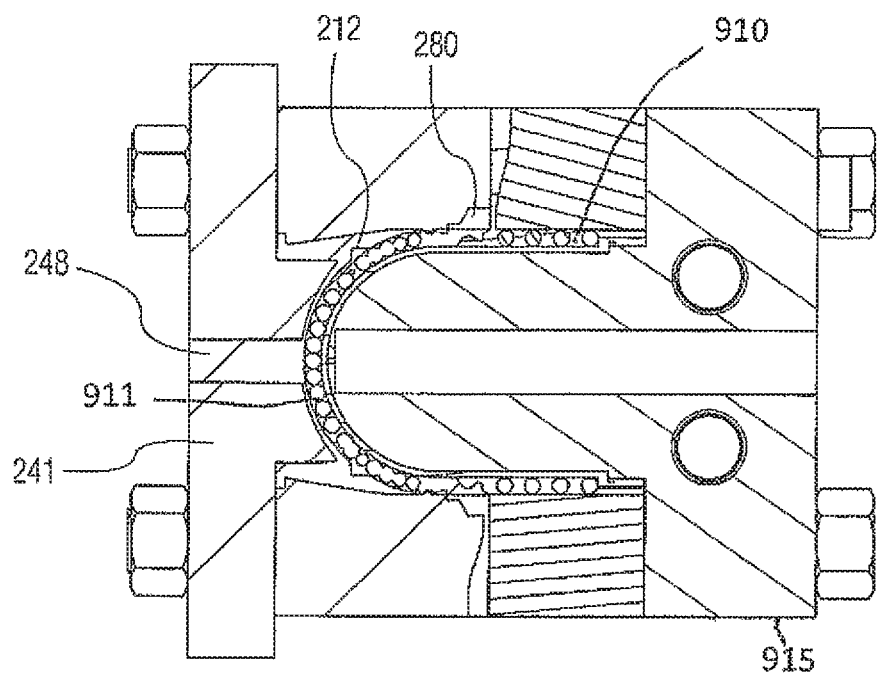
Figure 3:
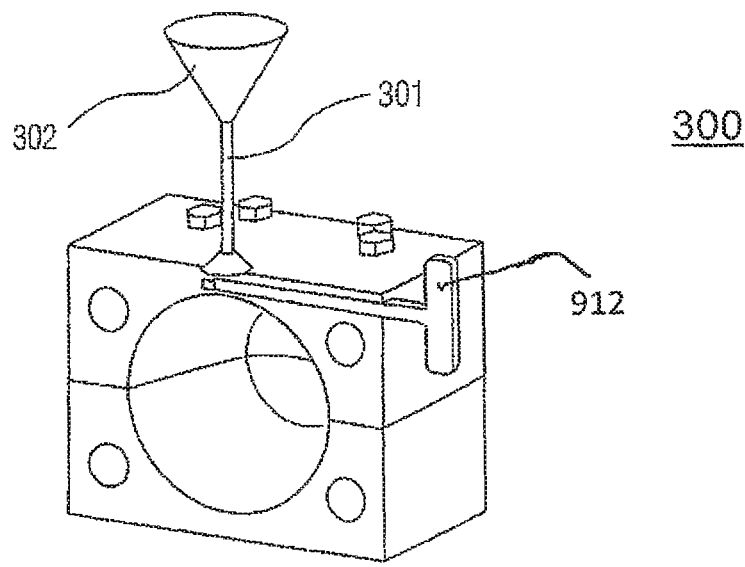
FIG. 3 shows fragment loading through the top of a mold 300 by a funnel means according to the invention.

The new molding processes of this invention utilize shorter duration processing methods which include transfer molding and injection molding. Sections of the mold are mechanically separated to control where fragments may be located. The resulting processes have much faster cycle times with advantages of fragment placement, fabrication of aerodynamic feature elements and obturators all being included within the same process. Other feature elements such as metal rings or threads can also be included in the mold, and over molded in the same way as the fragments, also being included within the same process. The processes comprise use of a metal mold or family of molds that have geometry to facilitate all of: fragment placement, fabrication of metallic pusher liners, obturation elements, other aerodynamic feature elements, and other structural components. Polymer may then be injected into the mold or molds; the finished part is then ejected from the mold. This is a common scenario in this invention process. Another method, illustrated by FIGS. 2A-2H, is a multiple stage molding process where each molding stage is done in a different cavity that includes the previous stage. This is novel in that it also allows the warhead to be molded with features that are not intended to contain fragments. This may include necessary features such as obturator bands or aerodynamic components that do not affect lethality. FIG. 2A shows the mold exterior 200 whereby a top section 225 can be joined to a bottom section 241. Each mold 200 version is sized for the particular warhead being enhanced. In FIG. 2B, balls 205 can be over molded in the cylindrical section 207 (see also FIG. 2H). Then, fragments 203 can be over molded onto the dome section 208. Boat tail sections 280 (FIG. 2H) can concurrently be added (molded in) with mechanical locks 212 (FIG. 2C) while doing the dome section. Gates, vents, and overflow areas can be machined. They will not have embedded fragments. FIGS. 2D and 2H show how one can load balls 205 in channel 910 between annular side piece 901 and the cylindrical section 207 with the top of the mold removed, in step 221, and inject dome material through the side in step 223. In FIGS. 2E and 2F, with dome 208 pointing down into an indentation 905 in the mold bottom 241, in step 243 the balls 203 can be loaded in, into a channel 911 between the dome area and the indentation 905 with dome material injected through the side in step 245. In FIGS. 2G and 2H, with mold laying down on a side 915, aerodynamic boat tail sections 280 can be attached to the dome area by T shaped parts 212 as boat tail material is injected through a side of the mold bottom 241 in step 248. In FIG. 3, fragment loading through top of the mold by funnel 302 is shown; and a slider which has mechanical feature 301 and a movable pin 912 which can lock or unlock the ball loading path.

Another method is a single mold with geometry shaped to a final desired shape. The method is novel when combined with preformed fragment loading. FIG. 4 displays this fragment loading method. It depicts what would be a cross section view looking from an operator's perspective through the center of the machine. It uses a modified bolt 401 that can be removed even while the mold 403 is clamped, allowing fragments to enter, and then tightened to allow the mold to maintain pressure during injection, for instance. This can facilitate automating ball loading by allowing fragments to be loaded without taking the mold out of the molding press. The bolt may be a threaded 9/16-12 hex bolt with 0.438 inch lathed tip to match the loading hole 415 (which forms a metal pipe). Balls may be loaded through hole 415 (which has a 0.438 inch outside diameter and a 0.375 inch inside diameter). The mold has an ejection side 412 which is bolted onto a sliding MUD frame plate. The mold also has 7/16 inch holes 414 for oil heating/cooling; 7/16 inch is also the drill size for a ¼ inch NPT tap quick disconnect. The mold has a quick disconnect pin 410 with spring loaded ball which ordinarily holds the work part onto the injection side. There is a washer 408 for part forming injection which has 6×⅛ inch pin holes to push a ring which ring is there placed to be connected.

Another method, shown in FIG. 5, illustrates a device providing over molding of a structural feature into a work part. Shown here is how steel ring 501 is molded into the work part. The ring is molded in during a single step with molding in the fragments. Here, the ring is intended to add structural strength to the part's assembly. (Addition of the ring in a round is intended to transfer loads from fragments during gun launch into other components of the weapon system used to launch the round). This mold machine/method is an achievement in that it allows such interfaces between parts to be simplified by including the component in the molded part as opposed to bonding it with adhesives or tapes later on. The sequence of operation here includes a) prepare the mold; b) load structural components as needed; c) load fragments; d) clamp mold; e) inject material; f) eject the part, and; g) repeat all above if multi-stage.

Still another method, illustrated in FIGS. 6A-6B, contains the pre-loading of fragments into a removable mold insert. This mold insert has an inner and outer geometry as required by the ultimate warhead design. The insert is placed into the molding machine as a single unit. This is novel because it de-couples the step of ball loading from the injection molding process step. Another benefit is that it allows the inclusion of outer ogive layers to be affixed to the molded component in a single step, eliminating assembly tolerance issues. FIG. 6A shows removable core 601 which has an area 602 for pre-formed fragments to be pre-loaded. Both 601 and 602 are then covered by a skin 603. Then core 601, thus preloaded with fragments, is inserted into area 604 in mold assembly 605, and matrix material is then injected into area 604 all around core 601. This molding method concept eliminates the need for loading pre-formed fragments within the injection mold which can be complex due to size and position constraints in a molding machine.

Another aspect of the invention is to use solvent-wet foamable celluloid material in place of the traditional polymer or epoxy materials. Foamable celluloid material was prepared by mixing nitrocellulose, camphor, and additives with suitable solvents. A dough-ish type wet, viscous mixture is formed after mixing. In order to form in a geometry, advanced molding techniques such as transfer molding and injection molding are used. Specified number of tungsten or steel balls are pre-loaded to the mold. The dough-ish type celluloid mixture is injected into the mold or molds and the part is then ejected from the mold. The molded parts are dried under ambient conditions to allow the solvents to diffuse out, forming a solid, stronger part. These methods to imbed metal balls in a solvent-wet celluloid formulation and later to foam the celluloid-metal matrix are novel.

The dry foamable celluloid imbedded metal parts are soaked under pressure with inert gases (such as CO2, N2, Ar, Air, etc.) in a pressurized vessel for a certain period of time. These soaked parts are then loaded in the foaming mold cavity. The mold is then heated to allow the celluloid material to foam and expand the celluloid mixture around the tungsten or steel balls. The mold is then cooled down and the part is de-molded of the cavity. This foamed celluloid material burns faster and cleanly, leaving no post-firing residue in this geometry. This process allows the part to form in any complex geometry, reduce the product density, makes the part flexible, yet tough enough to hold the tungsten/steel matrix, and yet lighter in weight. An advantage of foamed celluloid material is that after foaming the product, the foamed celluloid material imbedding metal create micron-sized closed cells around a tungsten or steel ball matrix, which reduces the overall product density by 30-50%, thus it is lighter in weight and yet strong and tough. In addition to the new device to mold/process in-situ with fragments, Applicants have also demonstrated this device and process using celluloid/foamed celluloid, a combustible material, compared to polymers, epoxy, etc. Embedding metal fragments in molten state is unique for a robust product. Such use of material (celluloid and foamed celluloid) in molten state with this device/process is unique and of important advantage.

While the inventions may have been described with reference to certain embodiments, numerous changes, alterations and modifications to the described embodiments are possible without departing from the spirit and scope of the invention as defined in the appended claims, and equivalents thereof.

What is claimed is:

1. A method for sequentially fabricating a cartridge case body through injection molding with a polymer material in a single mold, whereby multiple separate structural features are formed in different sections of the mold in sequential molding operations to fabricate the cartridge case body, the method comprising the steps of:

inserting one or more metal balls into the mold;
   over-molding the one or more metal balls in a channel onto a cylindrical section on an exterior of the cartridge case body;
   opening the mold;
   inserting one or more metal fragments into the mold;
   over-molding the one or more metal fragments in an indented area onto a dome section of the cartridge case body;
   opening the mold;
   turning the mold sideways; and
   over-molding a boat tail onto the dome area of the cartridge case body.

2. The method of claim 1 wherein the steps of over-molding the one or more metal balls, the one or more metal fragments and the boat-tail further comprises over-molding with solvent-wet foamable celluloid material in place of the polymer material.

3. The method of claim 2 further comprising the steps of:

preparing the solvent-wet foamable celluloid material by mixing nitrocellulose, camphor, and one or more additives with one or more solvents;
   ejecting the cartridge case body from the mold; and
   drying the cartridge case body under ambient conditions to allow the solvents to diffuse out.

4. The method of claim 3 wherein the step of preparing the solvent-wet foamable celluloid material further comprises soaking the nitrocellulose, the camphor and the one or more additives under pressure with an inert gas in a pressurized vessel and wherein the steps of over-molding the one or more metal balls, the one or more metal fragments and the boat tail further comprise injecting the solvent-wet foamable celluloid material into the mold, heating the mold for a sufficient time to allow the solvent-wet foamable celluloid material to foam and expand around the metal balls or metal fragments thereby creating foamed celluloid material, and cooling the mold.

5. The process as in claim 4 wherein the foamed celluloid material creates micron-sized closed cells around the metal balls and fragments which reduces the product density by 30-50%.

6. The process as in claim 1 wherein the cartridge case body being fabricated is a 40 mm grenade cartridge case body.

7. The process as in claim 1 wherein the cartridge case body being fabricated is a 120 mm projectile cartridge case body.

8. The process as in claim 1 wherein the cartridge case body being fabricated is an 81 mm mortar cartridge case body.

* * * * *